March 29, 1960     C. L. TAPPER     2,930,938

PHASE FAILURE PROTECTIVE DEVICE

Filed May 9, 1957     2 Sheets-Sheet 1

INVENTOR.
CARL L. TAPPER
BY
Frank A. Bower
ATTORNEY

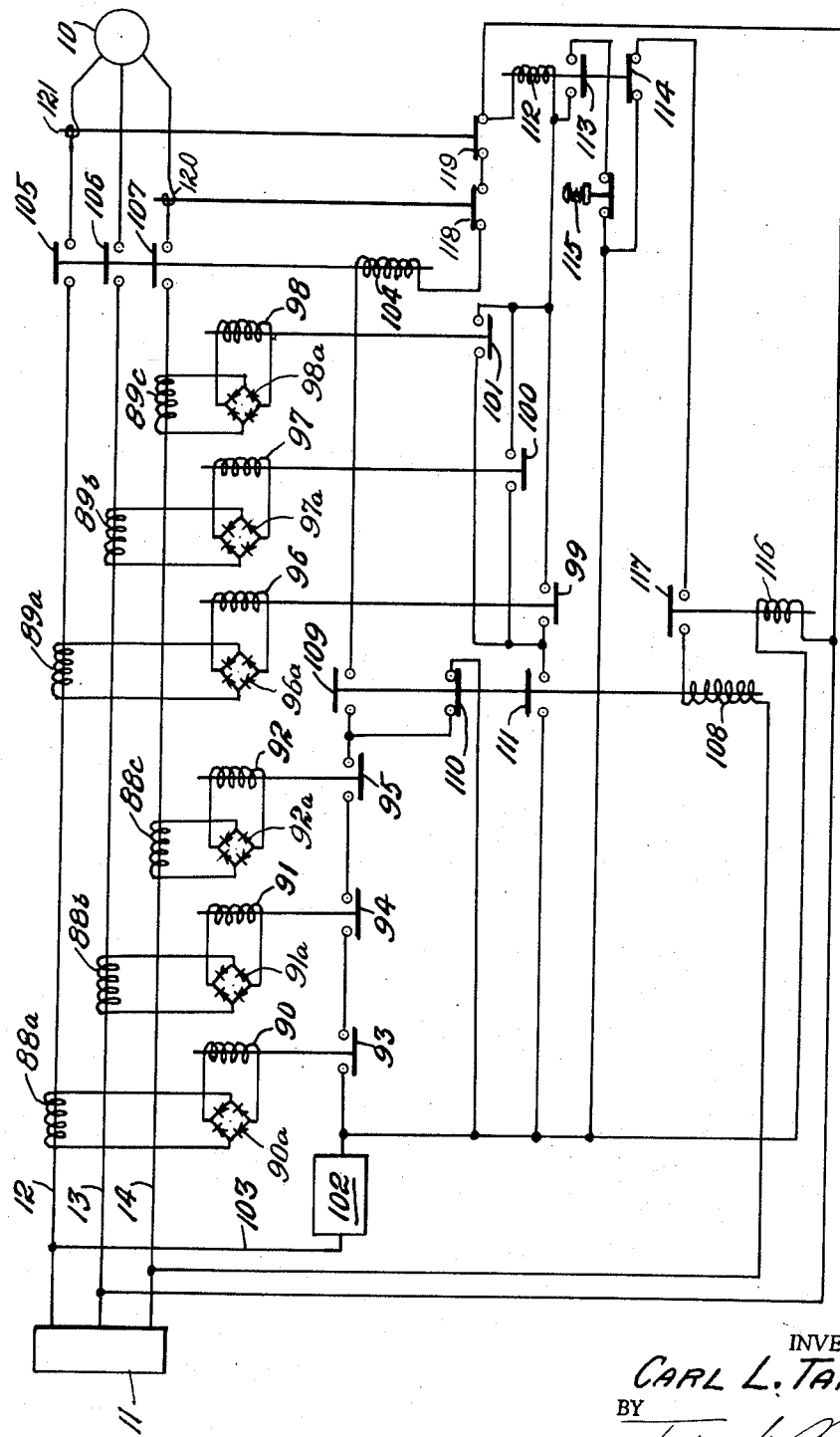

United States Patent Office 2,930,938
Patented Mar. 29, 1960

2,930,938
PHASE FAILURE PROTECTIVE DEVICE

Carl L. Tapper, Lowell, Mass.

Application May 9, 1957, Serial No. 658,140

2 Claims. (Cl. 317—46)

This invention relates to the protection of polyphase loads from the failure of any supply phase while power is being supplied to the load.

An object of the invention is to provide a protective device that disconnects a polyphase load from the electrical source on the failure of a line phase during operation, or prevents connection of the load to the source if a line phase is inoperative.

Another object is to provide a protective device that disconnects a polyphase load from a polyphase source on failure of a phase in the source.

A further object of the invention is to provide a phase failure protective device that is suitable for a wide range of loads.

Figure 1:
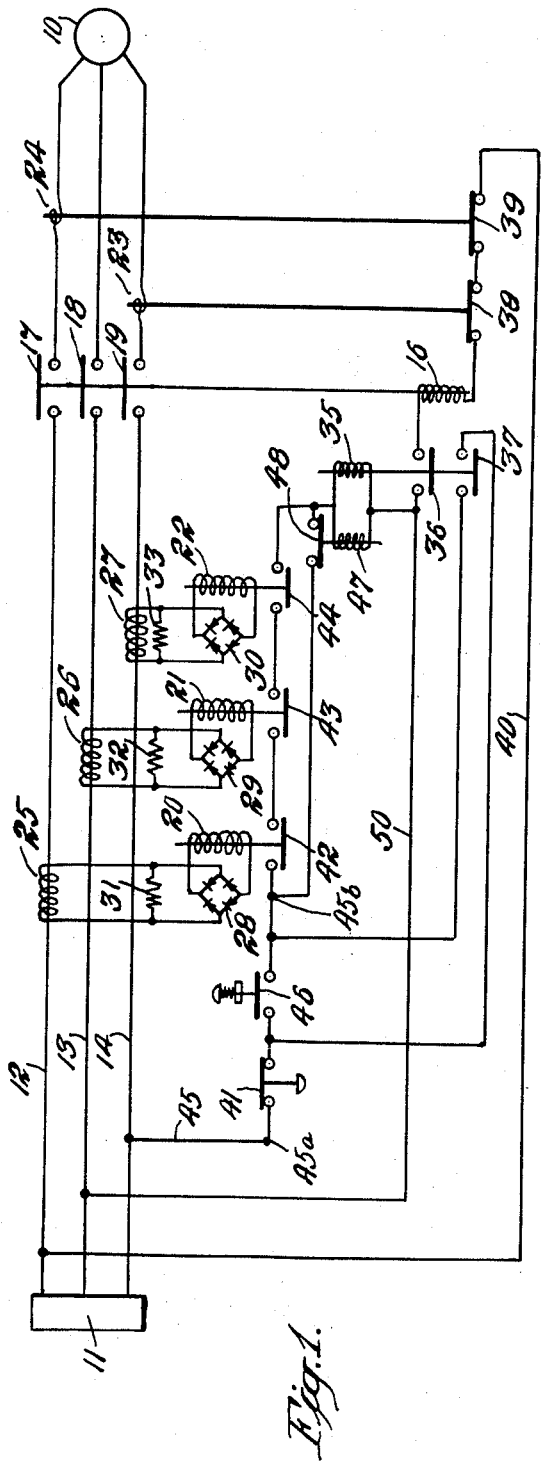
Figure 2:
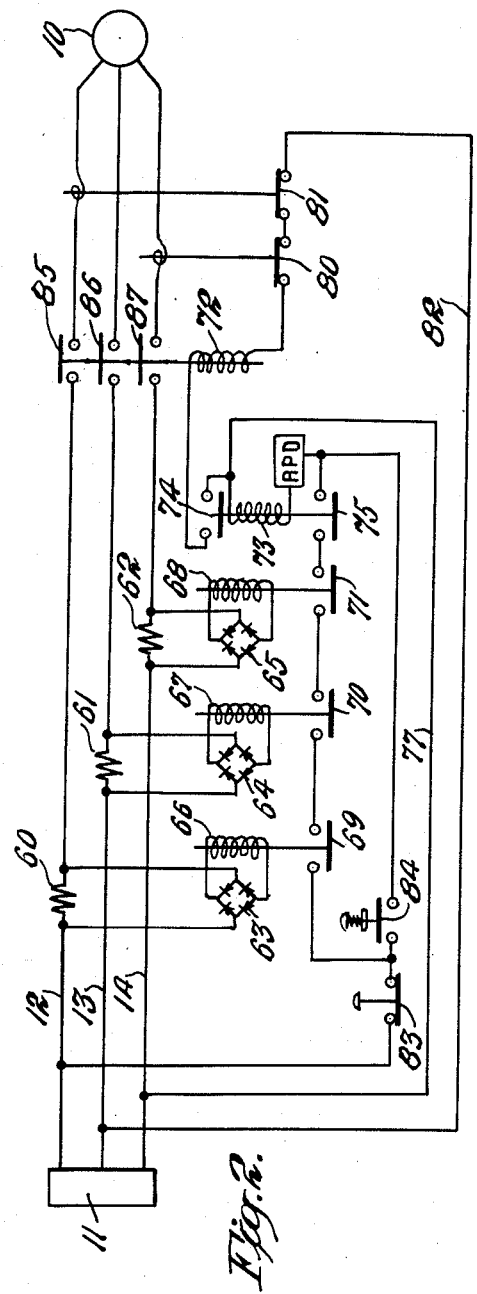

Other and further objects of the invention will become apparent from the following description taken in connection with the drawings, in which:

Figs. 1 and 2 are circuit diagrams illustrating embodiments of the invention in connection with a three-phase motor; and Fig. 3 is a circuit diagram illustrating the invention with phase failure relays for disconnecting the motor on a phase failure in either the primary or secondary circuits of the transformer supplying the motor.

Referring to Fig. 1, a three-phase alternating current motor 10 is connected to a three-phase alternating current supply 11 by means of the feed lines 12, 13 and 14. As the motor is operated, current is drawn through the lines in response to the load conditions applied to the motor. In order to protect the motor against failure of a phase in the supply during operation, a protection circuit is connected to the lines to respond to the decrease in current in the affected line and to disconnect the motor from the supply to prevent damage to the motor. The circuit is provided with a load or motor relay 16 having contacts 17, 18 and 19 for connecting the motor to the supply. The operation of this relay is responsive to the current in the lines 12, 13 and 14 by means of the relays 20, 21 and 22, and the overload relays 23 and 24. The relays 20, 21 and 22 are coupled to a respective line by means of current transformers 25, 26 and 27, and rectifiers 28, 29 and 30, respectively. The secondary windings of the current transformers impress a voltage proportional to the current flowing in the respective lines on the rectifiers. These rectifiers are preferably of the full wave bridge type and deliver a direct current to the windings of the relays. The windings are of a sensitive type releasing the armature holding the contact when the current in a respective line drops below a predetermined value. Resistors 31, 32 and 33 are connected across the respective secondary windings to limit the output voltage and protect the insulation of the transformers in the event of failure of an associated rectifier.

The winding of the relay 16 is connected across the lines 12 and 13 by means of the line 50, contact 36 of the relay 35, contacts 38 and 39 of the overload relays, and line 40. When the contacts 36, 38 and 39 are closed, current passes through the winding of the relay 16 closing the contacts 17, 18 and 19 to supply power to the motor 10. The contacts of the relay 16 remain closed until one of the contacts 36, 38 and 39 is opened. Contacts 38 and 39 remain closed unless a sustained overload condition occurs. The closure of contact 36 depends on the energization of winding 35.

The winding 35 may be connected across the lines 13 and 14 by several different current paths, depending on whether it is the starting period or the operating period. In starting the motor, the winding of relay 35 is connected across lines 13 and 14 by the line 45, stop contact 41, starting contact 46 and contact 48 of the time delay relay 47 and line 50 to the line 13. This also connects the winding of the time delay relay across the lines 13 and 14. This circuit is temporary since the starting contact 46 is held closed only long enough to energize the relay 35 to close contacts 36 and 37. Contact 37 shunts the starting contact 46 so that the starting contact may be released. Contact 36, as previously described, applies the voltage of lines 12 and 13 across the winding of the relay 16 to close the contacts 17, 18 and 19. During this period the contact 48 of the time delay relay remains closed so that the winding of the relay 35 is connected to the lines 13 and 14 through contacts 37 and 48.

With the contacts 17, 18 and 19 closed, the motor 10 draws current and the relays 20, 21 and 22 energize, thereby closing contacts 42, 43 and 44 in parallel with the closed contact 48. The time delay relay is set so that the contact 48 opens after the contacts 42, 43 and 44 are closed. When the motor 10 is drawing current for normal operation, the relay 35 is connected by means of line 45, stop contact 41, contact 37, contacts 42, 43 and 44, and line 50. Thus, a de-energization of any one of the relays 20, 21 or 22 will disconnect relay 35 from the lines 13 and 14 and de-energize the relay. This opens contact 36, which in turn de-energizes relay 16 and disconnects the motor from the source 11.

The energization of each of the relays 20, 21 and 22 depends on the current flow in a respective line. The voltage across the secondary winding of each current transformer is proportional to the current flowing in a respective line connected to the motor. A break in a respective line stops the current flow and de-energizes the respective relay. The current in a respective line or phase need not fall to zero to de-energize the relays. The circuit is sensitive and when the current falls below a predetermined value or "drop-out" point, the associated relay will de-energize. It is apparent that in the starting period the relay 16 will not close when a supply line or winding of the motor is open. Thus, protection is afforded under all conditions of operation of the motor.

For remote operation, the stop contact 41, start contact 46 and contact 37 may be eliminated and a remote control device may be connected between terminals 45a and 45b. This may comprise a manually operated switch or automatic pilot device. The motor will be restarted automatically upon restoration of all phases after a total power failure or failure of any phase, provided the contacts of the remote control device are closed. This is advantageous in unattended installations where it is desirable to operate the equipment promptly on the restoration of the phase failure. This failure may have occurred in the supply lines to the plant which are under the maintainance of personnel not connected with the operation of the equipment. When the phases are reconnected, the equipment will then return to operative condition on the automatic starting of the motor.

In Fig. 2 another embodiment of the invention is shown in which resistors 60, 61 and 62 are connected in a respective line 12, 13 and 14 in series with a respective phase. The voltage across the resistors is preferably proportional to the current throughout the operative range.

The rectifiers 63, 64 and 65 are connected across a respective resistor and the relays 66, 67 and 68 are connected to receive a direct current from a respective rectifier. The starter contact is connected in shunt to the series connected contacts 69, 70 and 71 of the relays. The load or motor relay 72 is energized by the closing of the contact 74 of the relay 73. This connects the winding of the relay 72 across the lines 13 and 14 by means of the line 77, contact 74, contacts 80, 81 and line 82. The relay 73 is initially energized through the stop contact 83, the manually closed starter contact 84 and the contacts of the remote pilot device, and connected to line 14 by lead 77. The starter contact 84 is closed for sufficient time for the relay 72 to close the contacts 85, 86 and 87 in lines 12, 13 and 14, respectively, and for the relays 66, 67 and 68 to become energized and close contacts 69, 70 and 71. The relay 73 is then connected to line 12 through contacts 83, 69, 70, 71 and 75.

Failure of any phase for any reason will cause the voltage impressed on the associated rectifier and sensitive relay to fall below the "drop-out" point, thereby de-energizing relay 73 which in turn de-energizes the motor relay to open contacts 85, 86 and 87 and stop the motor. The opening of the contacts of the remote pilot device will also stop the motor. The embodiments shown in Figs. 1 and 2 are applicable where phase failure occurs on the secondary side of the source 11.

In Fig. 3 another embodiment of the invention is shown in which two sets of relays are provided which are sensitive to the current conditions in each phase line. The relays 90, 91 and 92 are connected to the current transformers 88a, 88b and 88c through rectifiers 90a, 91a and 92a. The relays are sensitive to low currents and open the contacts 93, 94 and 95 when the current in the respective phase drops below a predetermined value. The relays 96, 97 and 98 have normally open contacts 99, 100 and 101 which are closed when the current in a respective phase exceeds a predetermined value.

The motor relay 104 has contacts 105, 106 and 107 to connect the motor 10 to the power source 11. In series with the winding of the motor relay 104 are the contacts 109, 110 of the time delay relay 108. The contact 110 is normally closed and the contact 109 is normally open but moves to the closed position on the initial energization of the time delay relay 108 and remains in the closed position during the energization of the time delay relay. Thus, during the starting period the contacts 109 and 110 are both closed. The motor relay is initially connected across the lines 12 and 13 by the line 103, pilot device 102, contacts 110 and 109, normally closed overload contacts 118 and 119 of overload relays 120 and 121, and line 122, and current is supplied to the motor relay winding 104 to close contacts 105, 106 and 107 to draw current through each phase. The contacts 93, 94 and 95 are closed in series with each other and in series with the contact 109. This contact remains closed during the energization of the time delay relay and contact 110 opens so that contacts 93, 94 and 95 and contact 109 pass the current energizing the relay 104. The opening of any one of these contacts will de-energize the relay 104 and protect the load or motor against failure of a phase on the secondary side of the supply transformer during the operation of the motor.

The time delay relay 108 is energized by means of contact 117, normally closed contact 114 and pilot device 102 connecting the winding of the relay across lines 12 and 14. The relay 116 is connected across lines 12 and 13 by means of the remote pilot device 102. Thus, on the supply of current by the source 11 through the actuated pilot device, the relay 116 becomes energized and closes contact 117 thereby energizing the time delay relay 108. If the remote pilot device remains closed during a phases failure, the relays 108 and 116 will become re-energized on the removal of the failure and the motor is started as explained.

On the occurrence of a phase failure, the time delay relay 108 must be de-energized in order to permit the restarting of the motor on the correction of the phase failure.

A phase failure which causes relay 104 to open its contacts 105, 106 and 107 de-energizes relay 108 directly, if the failure occurs in lines 12 or 14. If the failure occurs in line 13, relay 108 will be de-energized by the opening of contact 117 of the relay 116. Thus, upon failure of any phase on the secondary side of the supply transformer, the circuit will be restored to a condition permitting automatic restarting upon restoration of all phases.

The relays 96, 97 and 98 are connected to current transformers 89a, 89b and 89c through rectifiers 96a, 97a and 98a and have contacts 99, 100 and 101 which are normally open. These relays close the contacts 99, 100 and 101 when the current in a respective phase line exceeds a predetermined value. The contacts 99, 100 and 101 are connected in parallel with each other and in series with the contact 111 of the time delay relay 108. Since the time delay relay remains energized, contact 111 remains closed. When the pilot device 102 and the contact 111 are closed in normal operation, the relay 112 remains disconnected from the lines 12 and 13 by the normally open contacts 99, 100 and 101. The energization of the winding of the relay 112 is dependent upon the closing of one of the contacts 99, 100 and 101. As long as the current in all of the lines is below the maximum predetermined value, the contact 114 of the relay 112 remains closed and the winding of the time delay relay 108 remains energized. However, on the closing of any one of the contacts 99, 100 or 101 the winding of the relay 112 becomes energized, opening the contact 114 and de-energizing the time delay relay, which results in the opening of contact 109 and the disconnection of the motor relay 104, thereby opening the contacts 105, 106 and 107. The relay 112 has a contact 113 which is normally open. On energization of the relay 112 this contact closes, which maintains a current through the winding so that the time delay relay cannot be re-energized until the reset contact 115 is momentarily opened, opening contact 113 and re-establishing the normally closed position of contact 114.

The relays 96, 97 and 98 and the circuit associated with contacts 99, 100 and 101 protect the motor against the harmful effects of phase failure on the primary side of the power source when this source is a transformer. On a phase failure on the primary side of a transformer the current is maintained in lines 12, 13 and 14 either by the coupling of the windings of the transformer or by the back voltage of the motor, depending upon the type of connections of the winding of the three-phase transformer. For example, in the case of a Y-delta transformer a phase failure in the Y-connected primary winding may result in a current twice the normal value in one of the motor phases and approximately normal current in the other two phases. If the motor is operating in the upper portion of its power rating, this will cause one of the relays 96, 97 or 98 connected to the line carrying the higher current to close, thereby energizing relay 112 and de-energizing relay 108 to open contacts 105, 106 and 107 of the relay 104. The opening of contact 114 opens the circuit of relay 108 across lines 12 and 14 so that relay 108 cannot be maintained closed by the back voltage of the motor 10.

It is thus seen that the present invention eliminates the adverse effect of the induced voltage in the inoperative phase. The circuit is sensitive over a wide range of currents and power consumption, which renders the circuit available for a wide range of polyphase equipment. The circuit detects a phase failure in the supply or in the connecting lines while the motor is in operation and prevents the application of electrical power to the load if a phase or phases are inoperative. Thus, the motor is continuously protected against the high currents which occur in the remaining phases when one phase fails to carry current. By also having relays sensitive to an excess current, the motor or load may be protected against a phase failure on the primary side of the supply source. As described in connection with the embodiment in Fig. 3, the load may be protected against a phase failure within the supply source or in the secondary circuits of the supply transformer.

While the foregoing descriptions of the various phase failure systems are confined to the protection of a three-phase motor, it will be readily apparent that the embodiments may be modified for the protection of two-phase motors or motors having any number of phases, or to any other type of load where it is required that control devices respond either to the loss of one or more phases of the supply or to a predetermined decrease or increase in the current in any phase.

I claim:

1. A phase failure protective device for disconnecting a polyphase load from a power source comprising a main relay having contacts for connecting the load to the power source, a first set of current transformers each connected in series with a respective phase between said main relay contacts and a power source, rectifier means coupled to a respective current transformer, relays connected to a respective rectifier responsive to the current in a respective phase and having contacts connected in series with said main relay for de-energizing said main relay when a current in any phase drops below a predetermined value, a second set of current transformers each connected in series with a respective phase between said main relay contacts and a power source and having contacts connected in parallel, said contacts being open to normal currents and closing when the current in a respective phase exceeds a predetermined value, starting relay means energized from two of said phases for completing the series circuit through said main relay and an overload interrupting relay having a contact in series with said starting relay means and a winding in series with a second set of parallel contacts to disconnect said starting relay means to de-energize said main relay by de-energizing said starting relay means.

2. A phase failure device as set forth in claim 1 in which an auxiliary relay means has a winding connected to the third phase and a contact in series with the starting relay means to de-energize said starting relay on failure of the third phase.

References Cited in the file of this patent

UNITED STATES PATENTS

| | | |
|---|---|---|
| 1,179,637 | Kruse | Apr. 18, 1916 |
| 2,609,425 | Turnupseed | Sept. 2, 1952 |
| 2,769,131 | Immel | Oct. 30, 1956 |

FOREIGN PATENTS

| | | |
|---|---|---|
| 66,216 | France | June 5, 1956 |